(12) United States Patent
Kiarostami

(10) Patent No.: US 7,327,269 B2
(45) Date of Patent: Feb. 5, 2008

(54) FLAME SENSOR FOR A BURNER

(75) Inventor: Nader Kiarostami, Delta (CA)

(73) Assignee: International Thermal Investments Ltd., Richmond, British Columbia (CA)

( * ) Notice: Subject to any disclaimer, the term of this patent is extended or adjusted under 35 U.S.C. 154(b) by 187 days.

(21) Appl. No.: 11/005,888

(22) Filed: Dec. 7, 2004

(65) Prior Publication Data

US 2005/0140514 A1    Jun. 30, 2005

Related U.S. Application Data

(63) Continuation-in-part of application No. 10/441,929, filed on May 19, 2003, now abandoned.

(30) Foreign Application Priority Data

Sep. 30, 2004    (CA) .................................. 2483367

(51) Int. Cl.
*G08B 17/12*    (2006.01)

(52) U.S. Cl. ...................... 340/577; 340/578

(58) Field of Classification Search ................ 340/577, 340/578, 628, 630, 632, 554; 431/14, 15, 431/79; 250/554, 339.14, 339.15

See application file for complete search history.

(56) References Cited

U.S. PATENT DOCUMENTS

| | | | | | |
|---|---|---|---|---|---|
| 4,639,717 | A | * | 1/1987 | De Meirsman | ............. 340/578 |
| 4,904,986 | A | * | 2/1990 | Pinckaers | ................... 340/578 |
| 6,168,419 | B1 | * | 1/2001 | Mindermann | ................ 431/79 |
| 6,652,266 | B1 | * | 11/2003 | Murgu et al. | ................. 431/79 |
| 6,677,590 | B2 | * | 1/2004 | Nakauchi et al. | ....... 250/339.15 |
| 6,818,893 | B2 | * | 11/2004 | Carter | ................... 250/339.07 |

* cited by examiner

*Primary Examiner*—Van T. Trieu
(74) *Attorney, Agent, or Firm*—John Russell Uren

(57) ABSTRACT

A flame sensor circuit is used to sense the presence or absence of a flame in a burner. A first sensor generates a first intensity signal which is proportional to the light intensity of the flame in the burner. A second sensor generates a second signal produced by the flicker of the flame. The presence of both the first and second signals is sensed and if both are present, an output signal is generated to indicate the presence of the flame in the burner.

12 Claims, 14 Drawing Sheets

FLAME SENSOR FOR A BURNER

CROSS-REFERENCE TO RELATED APPLICATION

This is a continuation-in-part of application Ser. No. 10/441,929 filed May 19, 2003 now abandoned and entitled IMPROVED FLAME SENSOR.

INTRODUCTION

This invention relates to a flame sensor and, more particularly, to a flame sensor which senses the presence of a flame within a burner and which flame sensor produces two signals to verify the presence of the flame within the burner.

BACKGROUND OF THE INVENTION

Flame sensors are used to sense the presence or absence of a flame in a heater or burner, for example, or other apparatus. The heater or burner may be used to heat water or ambient air and the fuel used may be one of several different types.

In the event the flame is extinguished, although not deliberately so, the sensor is adapted to sense the absence of the flame. The flame can be extinguished, for example, by fuel starvation or other malfunction. After sensing the extinguishing of the flame, the sensor or its related circuitry will send an alarm signal to a microcontroller. The microcontroller will take appropriate action such as shutting down the heater or burner by terminating fuel flow. In such a manner, serious safety problems such as continued fuel flow into a hot burner without a flame being present for combusting the fuel are avoided.

However, it is inconvenient to terminate the fuel flow if the flame is present and the burner is working properly. The termination of the fuel flow causes termination of the operation of the burner or heater unintendedly if the flame sensor sends an incorrect signal to the control panel. The present invention has as an object the avoidance of inadvertent burner shutdown and, as well, the avoidance of burner operation when the flame is extinguished.

One reason for unintended burner shutdown is signal contamination of the signal from the flame sensor, Since the power of the signal previously sent to the amplifier is quite small, in the range of 50 mv to 200 mv, and since the amplifier was located some distance from the sensor, any noise caused by common mode radiation or other RF signals could disrupt the integrity of the signal being passed to the amplifier by the sensor. This causes incorrect information to be read by the microcontroller with the result that the heater could be inadvertently shut down or, alternatively, the heater may continue to run in a flame out condition. Both scenarios are not desirable.

In our U.S. patent application Ser. No. 09/579,444 filed May 26, 2000, the contents of which are incorporated herein by reference, there is disclosed a circuit for a flame sensor which utilises an amplifier and rectifier circuit in which full amplification of the pulsed signal leaving the amplifier does not take place due to a feedback loop between the output of the amplifier and the inverting input of the amplifier. This leads to a decreased reading sensitivity of the pulsed signal generated by the photodiode of the flame sensor.

To sense the presence or absence of a flame in a burner, a photo diode is generally used. As the flame flickers in the burner during operation, the photo diode will sense the flickering or change of light in the flame and generate a signal to indicate the presence of a flame. The components of the heater, however, generates noise and this noise can produce a signal which is similar to the signal generated by the photo diode when a flame is present. Thus, the flame sensor circuit may incorrectly signal that a flame is present.

SUMMARY OF THE INVENTION

According to one aspect of the invention, there is provided a method of sensing the presence of a flame in a burner comprising the steps of generating a first signal from a sensor which first signal is an intensity signal proportional to the light intensity of said flame in said burner, generating a second signal by detecting the change of voltage in said sensor which change of voltage is caused by the flicker of said flame in said burner, detecting whether said first and second signals are present and producing an output signal if said first and second signals are both detected.

According to a further aspect of the invention, there is provided a circuit for a flame sensor used for sensing the presence of a flame in a burner, said circuit comprising a sensor for sensing said flame, said sensor producing a first intensity signal proportional to the light intensity of said flame in said burner, said sensor producing a second flickering signal sensing the flicker of said flame in said burner, and a second output signal circuit component for producing an output signal when said first intensity signal and said second flickering signal are present at said second output signal circuit component.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 6:
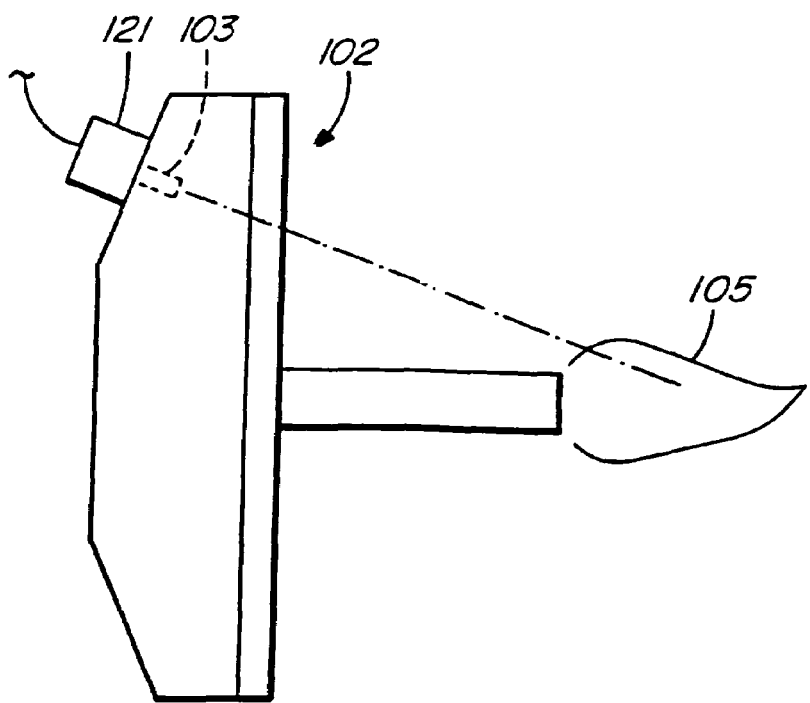
FIG. 6 is a diagrammatic isometric view illustrating the position of the flame sensor relative to the flame being sensed.
Figure 7:
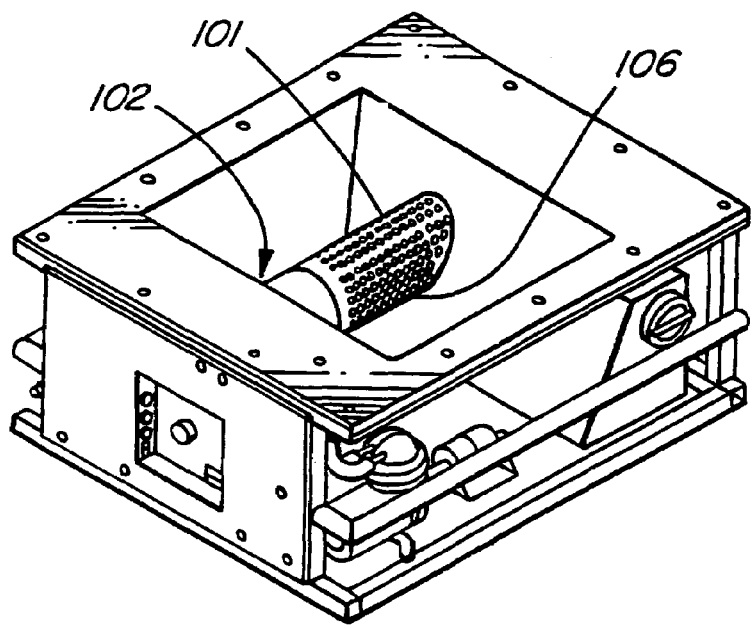
FIG. 7 is a diagrammatic isometric view of a powered multifuel burner which utilises the flame sensor according to the invention.

Referring now to the drawings, a powered multifuel burner is generally illustrated at 100 in FIG. 7. An infrared type burner 101 has a flame 105 (FIG. 6) generated within the cylinder 106 of the burner 101 by way of an air aspirated nozzle (not shown) which uses a venturi effect to draw fuel into the nozzle. Combustion takes place outside the nozzle but within the cylinder 106. The flame sensor 110 is located generally at 102 as illustrated in FIG. 6.

The flame sensor 110 may include either an infrared sensor or an ultraviolet sensor or, alternatively, a combination of an infrared and ultraviolet sensor. Each or both of the sensors 103 are positioned in the housing 121 (FIG. 4A) to sense the visible infrared and ultraviolet radiation produced by the combustion flame. The sensors 103 selected for the particular application will depend on the flame being produced within the burner 100. If, for example, the flame burns with an orange patina, the primary sensor will be infrared. Alternatively, if the flame burns primarily with blue radiation, an ultraviolet sensor will be utilised.

Figure 1A:
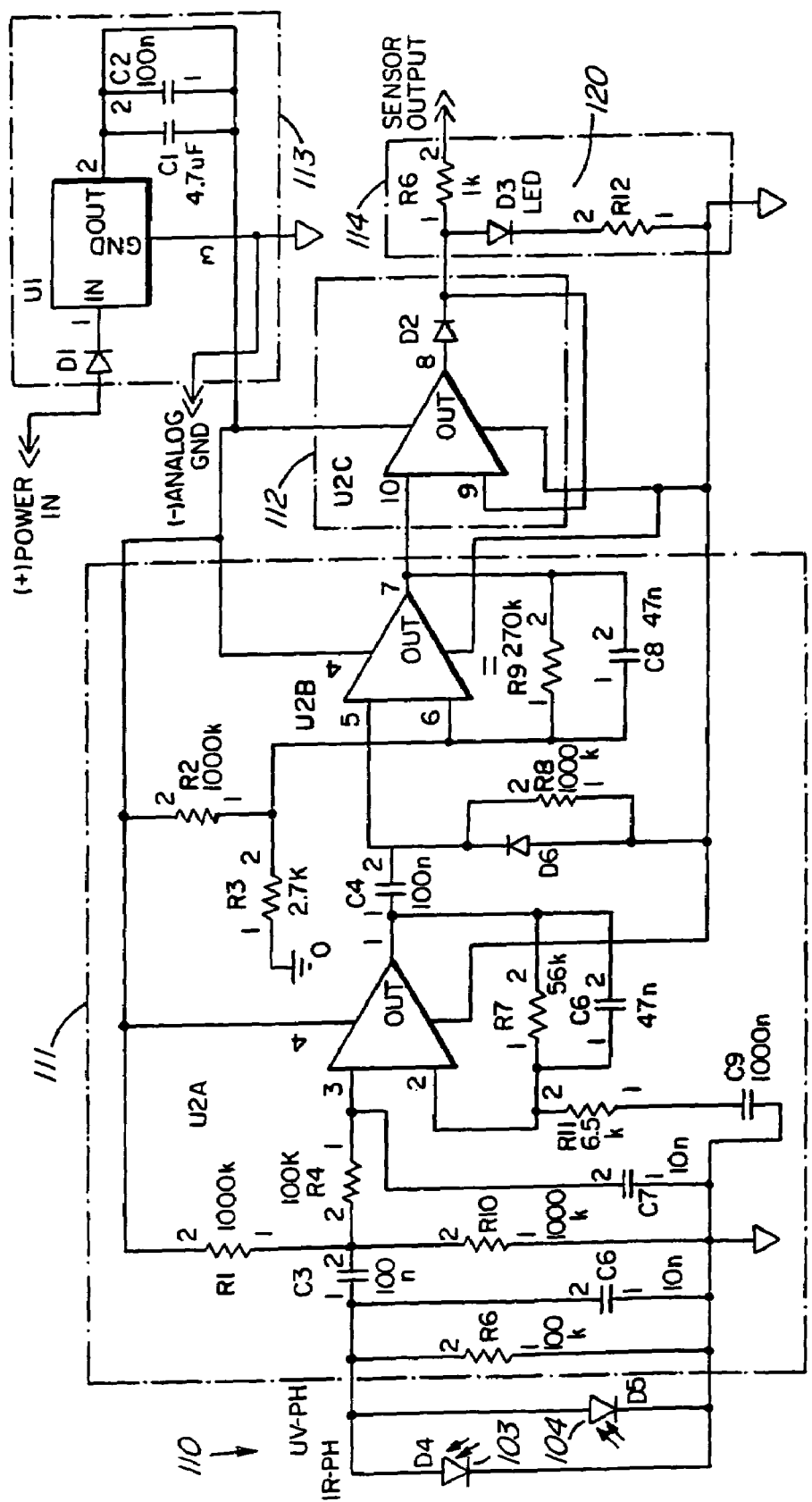
FIG. 1A is a diagrammatic schematic of the flame sensor by way of photodiode which incorporates the amplifier circuitry according to a first aspect of the invention.
Figure 1B:
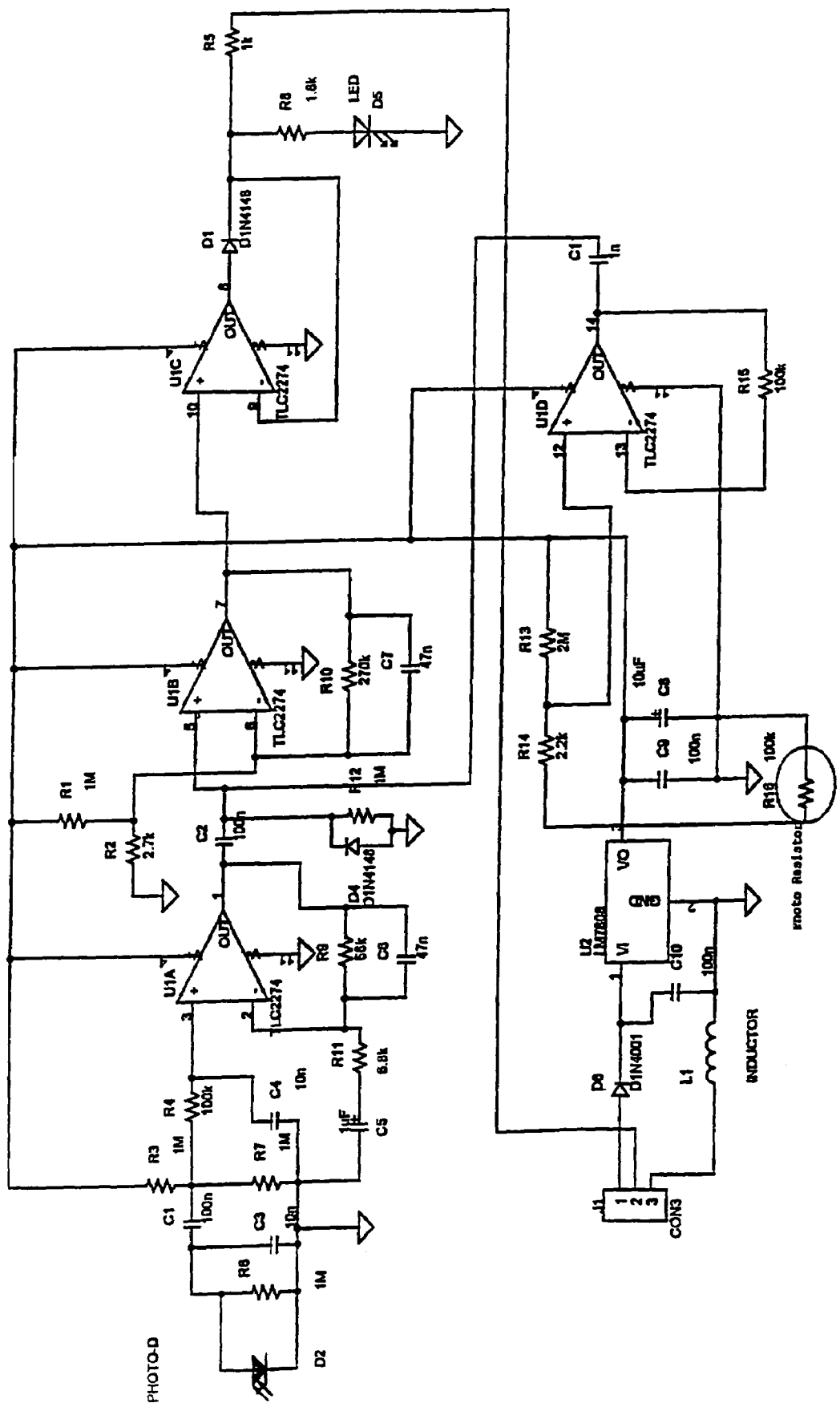
FIG. 1B is similar to FIG. 1A but illustrates the use of a flame sensor which is a photoresistor rather that the photodiode of FIG. 1A.

The schematic of FIG. 1 discloses both infrared and ultraviolet sensors 103, 104 and their related circuitry. The sensors 103, 104 are photodetectors shown generally at 110. The output from the sensors 103, 104 passes to a real to real integrator amplifier section 111. A rectifier 112 rectifies the signal passing from the amplifier section 111. A voltage regulator 113 is used to regulate the voltage and a read out circuit 114 is used to show the conditions of the signal passing from the sensors 103, 104, the amplifier 111 and rectifier 112. The read our circuit is exemplified by an LED generally shown at 120 in FIGS. 1 and 4A.

All of the components of the schematic of FIG. 1 are included with the sensors 103, 104 and are mounted within the housing 121 (FIGS. 4A, 4B and 5) associated with the sensors 103, 104. It will thereby be seen that the components described, particularly the amplifier circuit 111, are located closely to the sensors 103, 104 and, indeed, are directly connected thereto to avoid the need for cables and the like to run from the sensors 103 to the main board 124 where further processing is accomplished. This allows the relatively small signal generated by the sensors 103, 104 to be amplified without the signal picking up noise from ground terminal and RF radiation which may be present and picked up by the cables if the sensors 103, 104 were separated from the amplifier 111 which otherwise would be located in the main board 124.

Figure 2A:
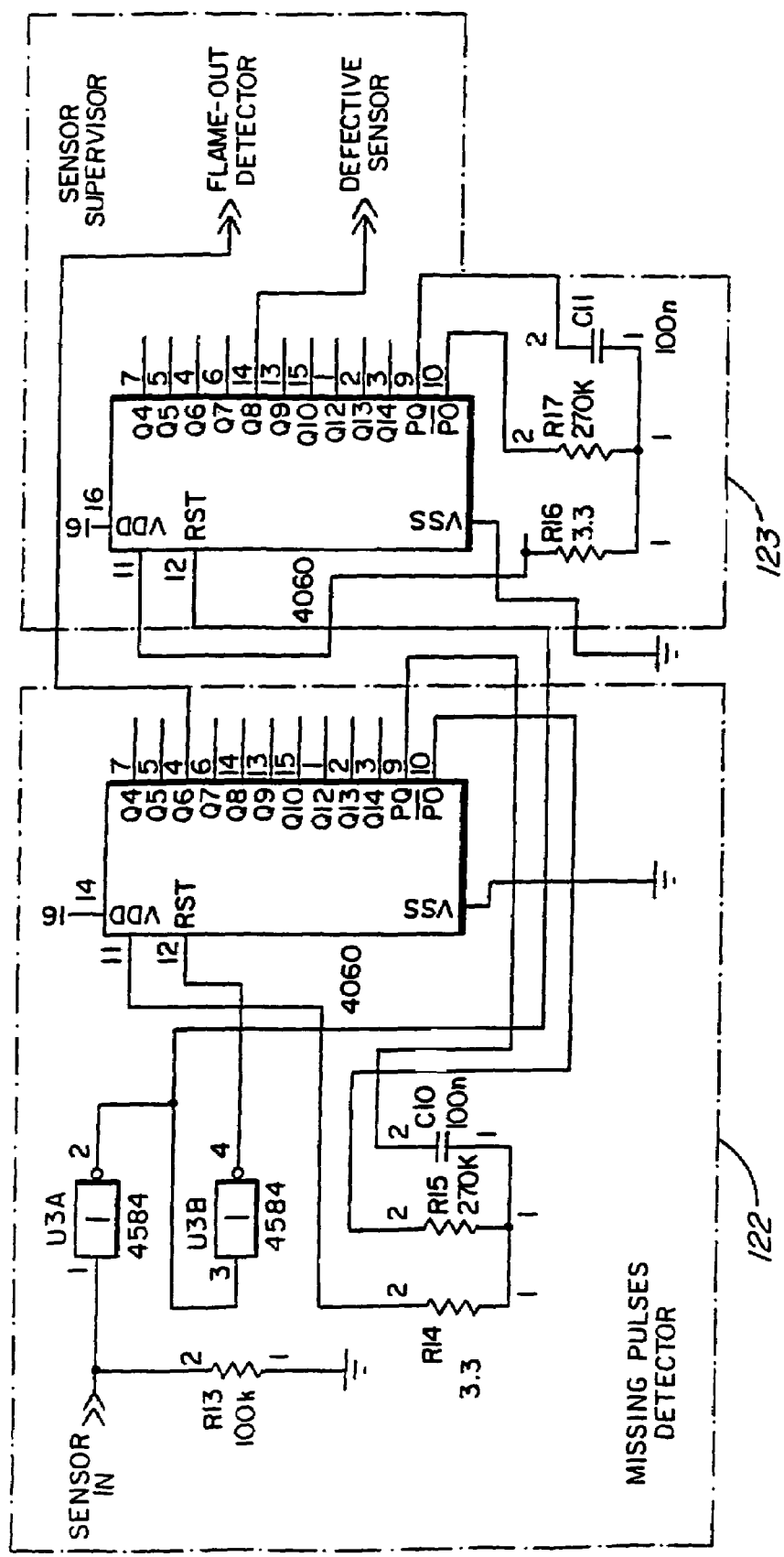
FIG. 2A is a diagrammatic schematic of the missing pulses detector and sensor supervisor used for monitoring the flame sensor signal and the integrity of the connections between the amplifier and the microcontroller.

The missing pulse detector and the sensor supervisor are generally illustrated at 122, 123, respectively, in FIG. 2. These circuit components are located remotely from the sensor housing 121 and on the main board illustrated generally at 124 in FIG. 3. These components 122, 123, as well as the remaining main board circuit components which will be described are separated from the components of FIG. 1 by cable 129 (FIG. 4A) and are remote from the housing 121 of the sensors 103, 104.

Figure 2B:
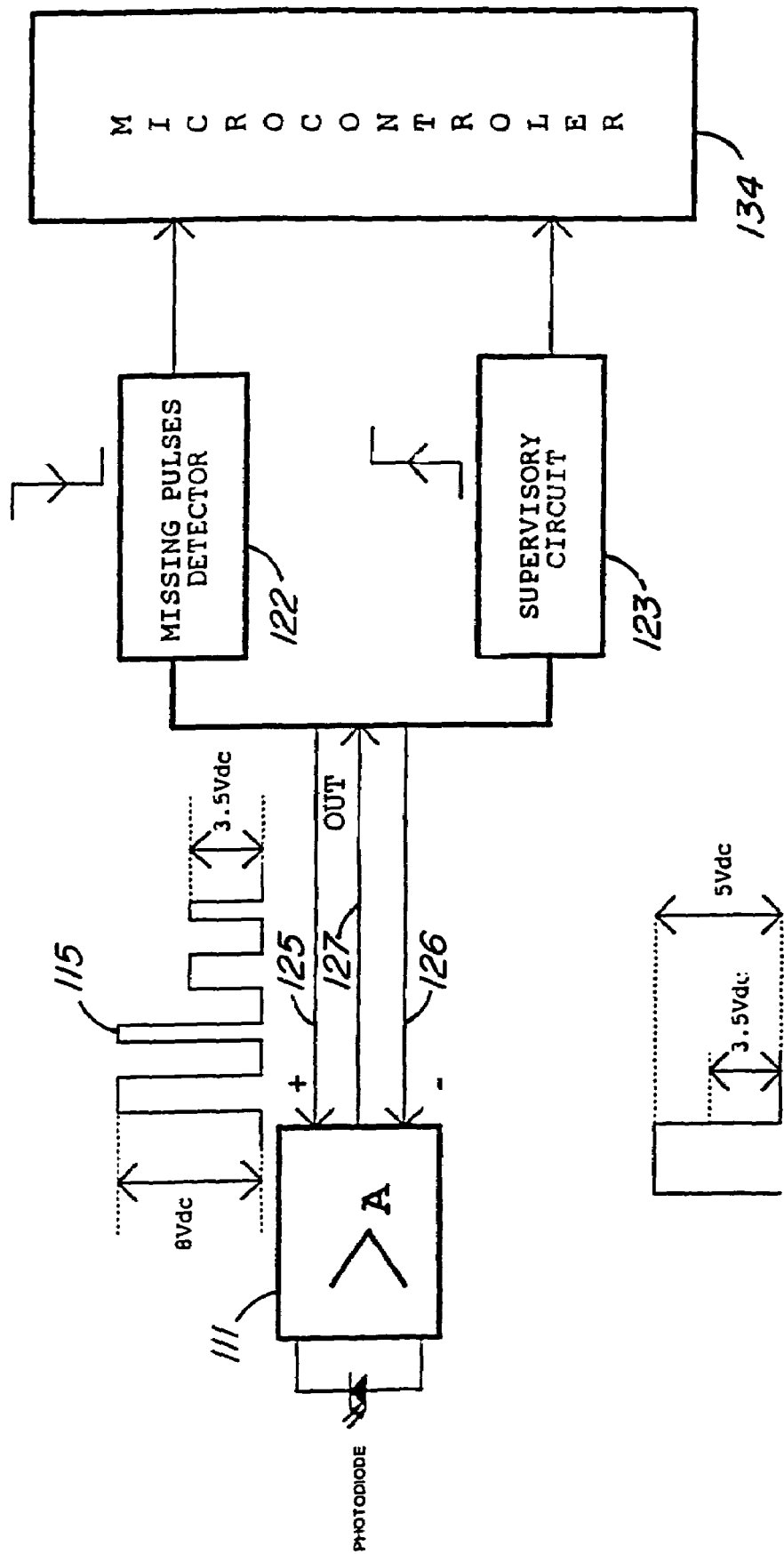
FIG. 2B is a diagrammatic and enlarged schematic particularly illustrating the connections between the amplifier and the microcontroller, the missing pulses detector and the supervisory circuit.
Figure 3A:
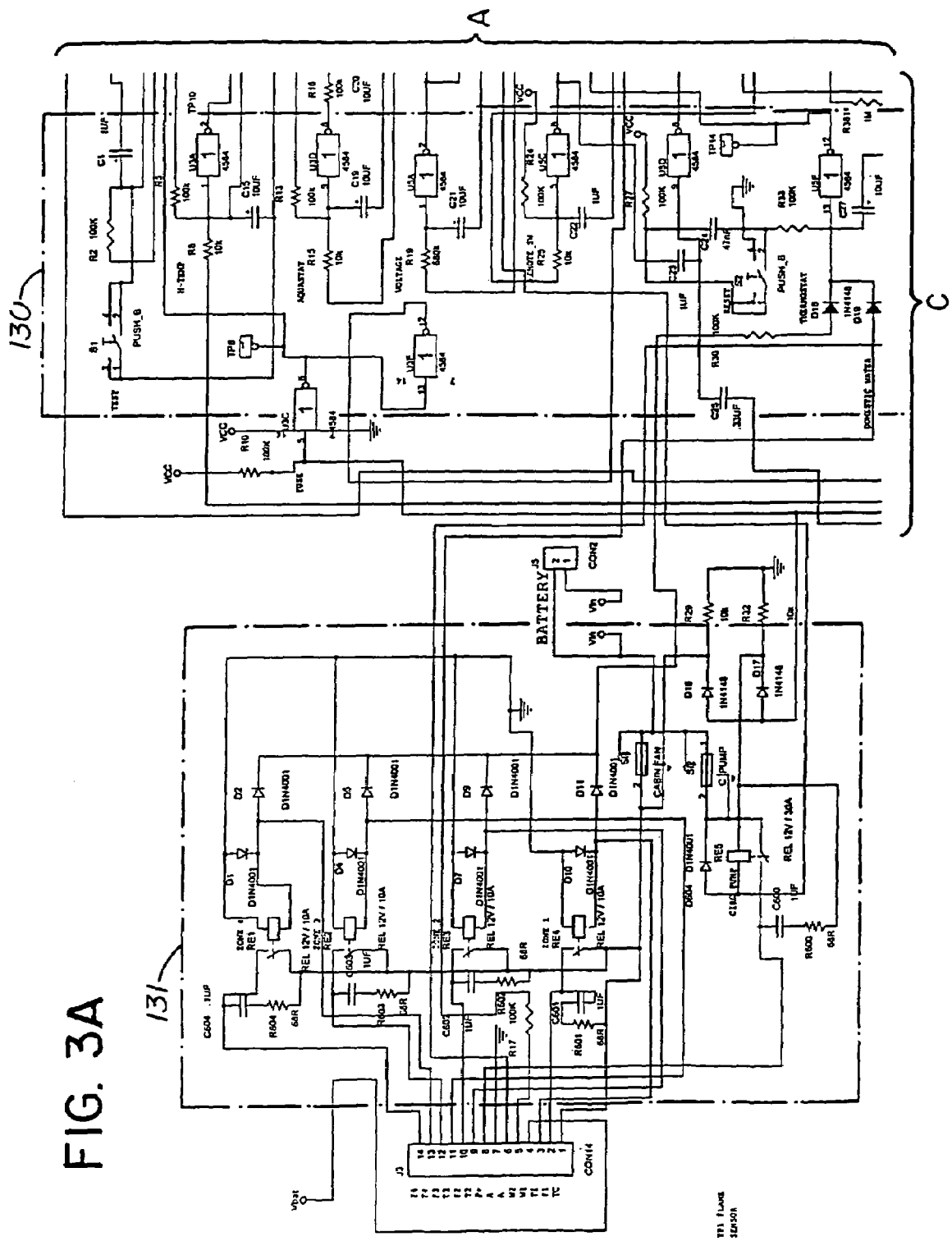
FIGS. 3A-3F are diagrammatic schematics of the main board which includes the missing pulses detector and the sensor supervisor of FIGS. 2A and 2B.
Figure 3B:
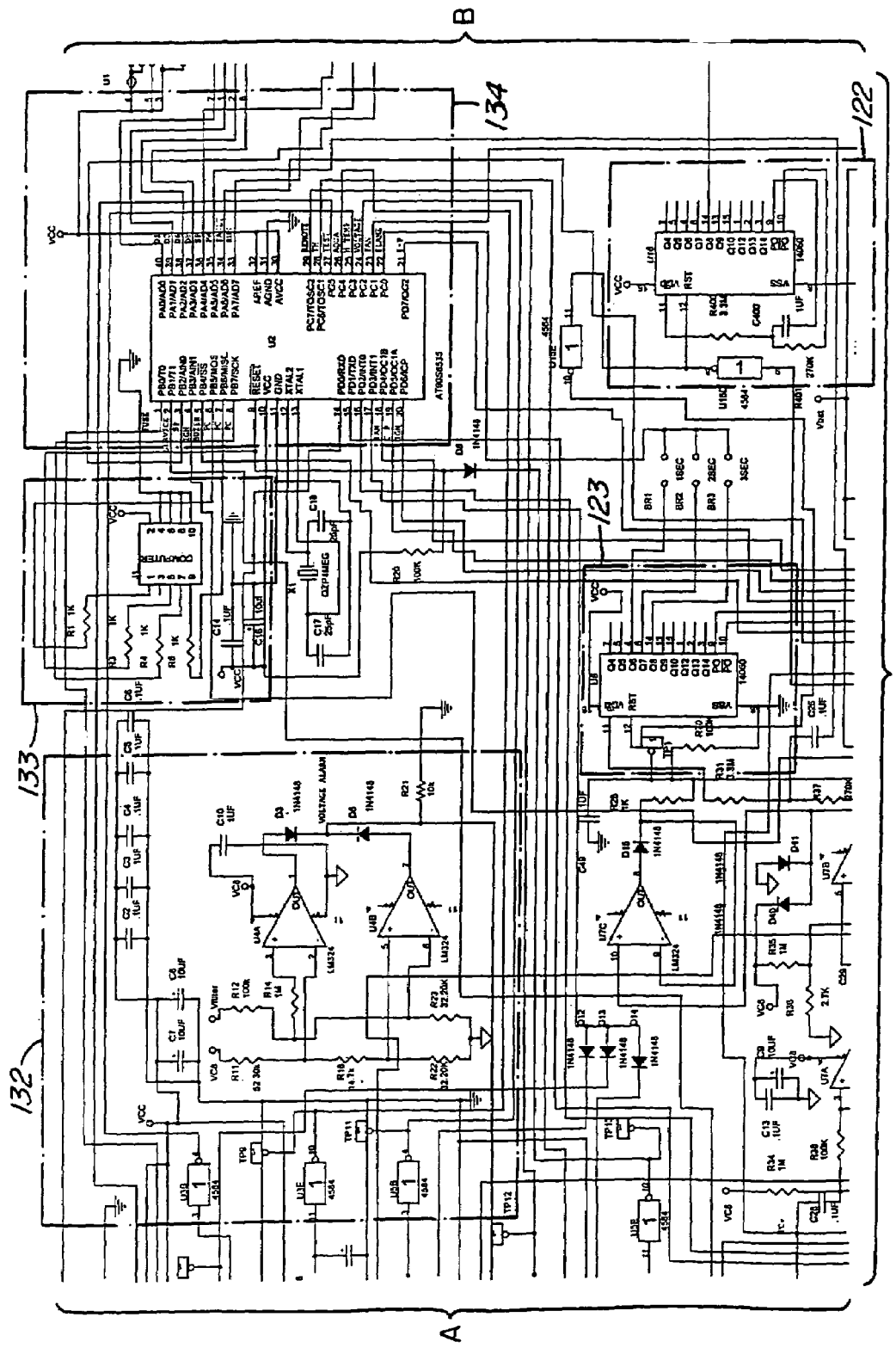
Figure 3C:
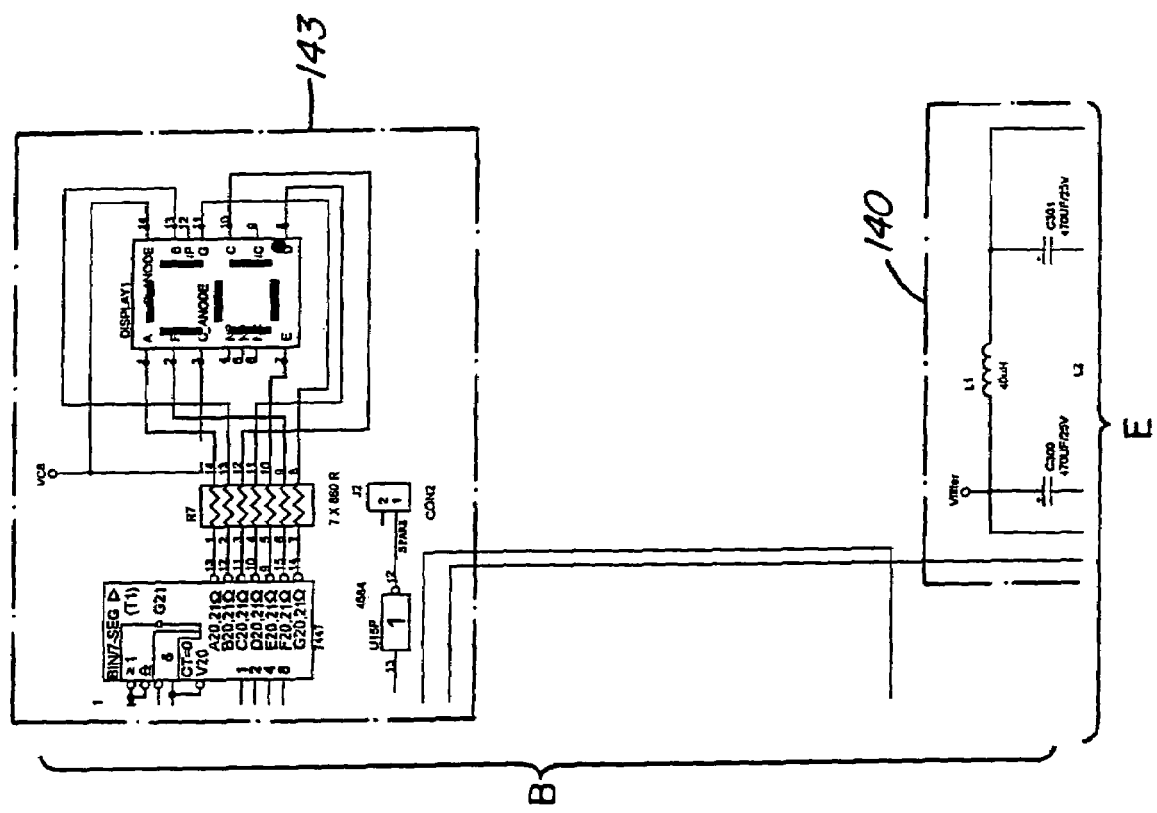
Figure 3D:
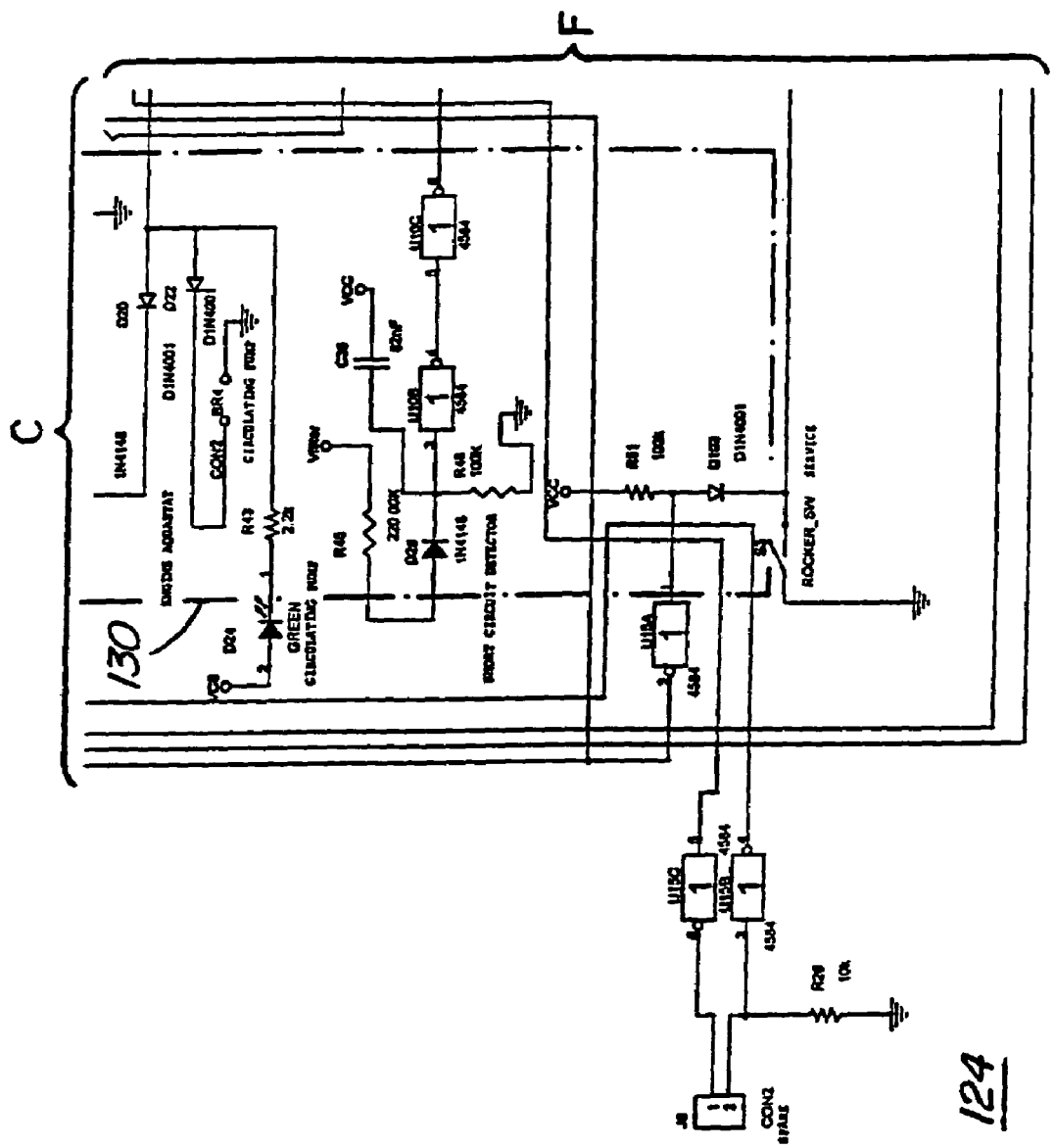
Figure 3E:
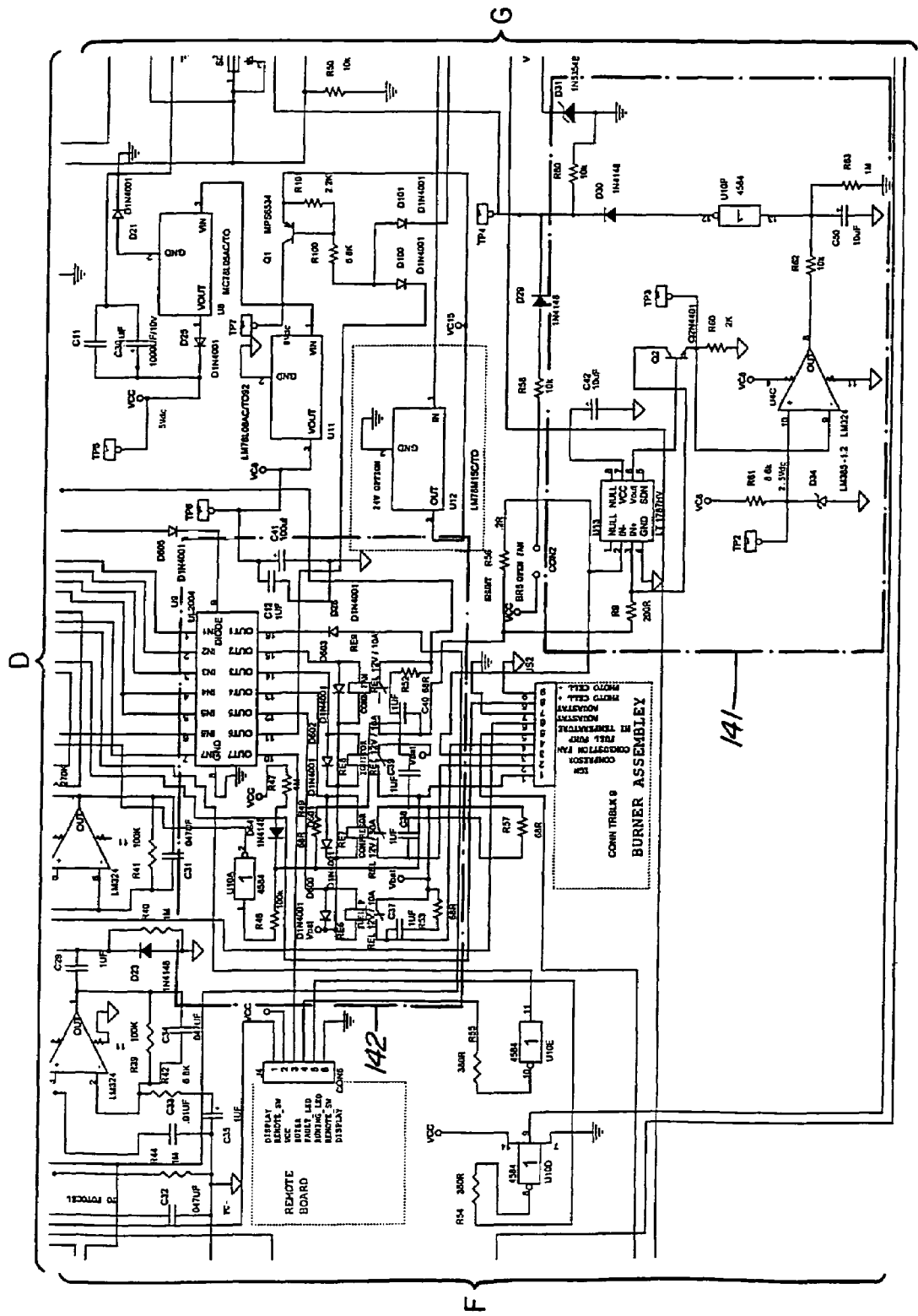
Figure 3F:
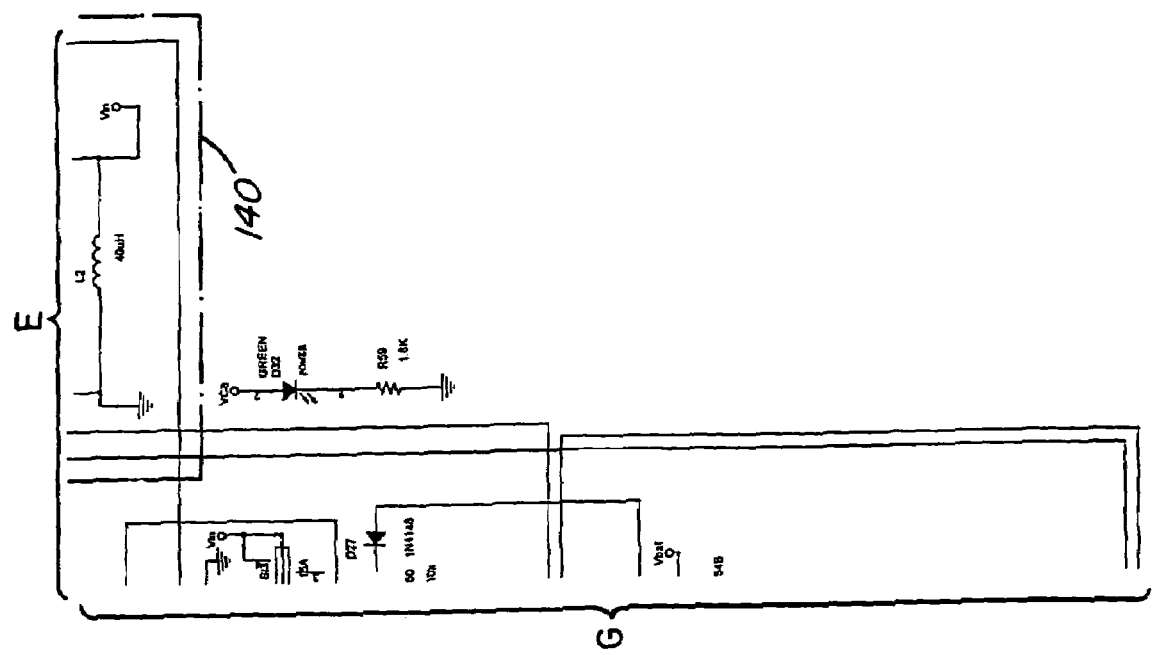

Referring to FIGS. 2B and 3, the missing pulses detector 122 and the sensor supervisor 123 are shown in greater detail and are included on the main board 124. In addition, the burner interface circuitry 130, zone board 131, voltage supervisor 132, computer interface 133, microcontroller 134, filter 140, open circuit for combustion fan supervisory 141 and relay driver 142 are further included on the main board 124. A display unit 143 is included on the main board 124 which shows the status of the various functions of the burner 100.

OPERATION

In operation, combustion of the fuel in burner 100 (FIG. 5) will be initiated and, following the initiation of the combustion, the sensors 103, 104 will be activated to monitor the flame of the burner 100. At the beginning of the ignition, the flame sensors 103, 104 receive power. The sensors 103, 104 are located adjacent the flame of the burner 100 (FIG. 6) and sense the infrared and ultraviolet radiation, respectively, emanating from the flame 105. The circuitry associated with the flame sensors 103, 104 generates a series of pulses 115 (FIG. 2B) read by the missing pulses detector 122. In the event the flame shuts down, no pulses will be generated with the result that the missing pulses detector 122 will sense the missing pulses and instruct the microcontroller 134 accordingly in order to shut down the burner 100.

The signal from the photodetectors or sensors 103, 104 will pass to the real to real integrator amplifier 111 and, thence, to rectifier 112. Voltage regulator 113 will regulate the voltage of the signal generated by the amplifier 111 and the signal leaving rectifier 112 will pass to the missing pulses detector 122. The LED 120 will show the status of the sensors 103, 104 while under operation.

Figure 4A:
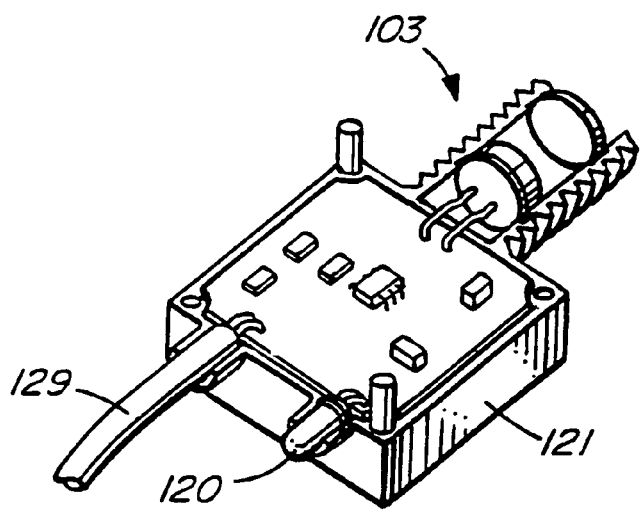
FIGS. 4A and 4B are diagrammatic isometric cutaway views of the housings used to house the flame sensor, the amplifier, the sensor supervisor and their related circuitry.
Figure 4B:
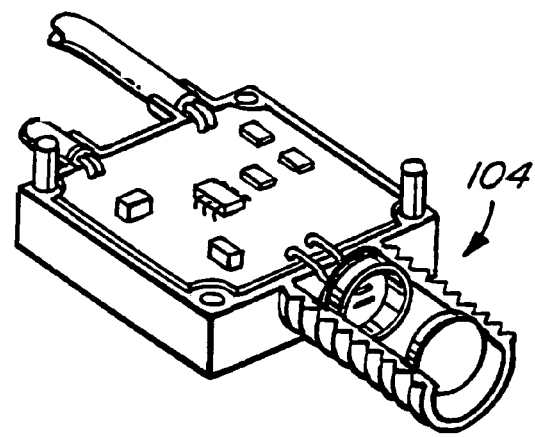
Figure 5:
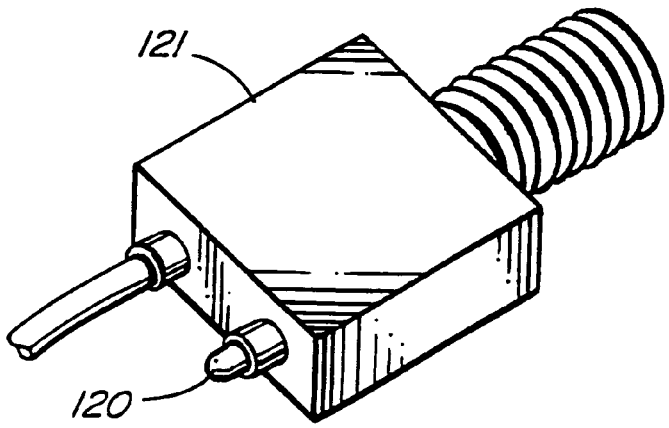
FIG. 5 is a diagrammatic isometric view of a housing but not being illustrating in cutaway.

The signal from the rectifier 112 which passes to the missing pules detector 122 will appear at "A" in FIG. 4A. The remaining circuitry illustrated in FIG. 3, including the missing pules detector 122 and the sensor supervisor 123 are located remotely from the sensors 103, 104, by way of cables 125, 126, 127 (FIG. 2B).

With reference to FIG. 3, the remaining circuitry related to the sensors 103, 104 is illustrated. Such circuitry includes circuitry relating to the operation of the burner 100 and the various functions that the burner 100 must fulfil. However, the circuitry described and its position within the housing 121 adjacent to the sensors 103, 104 allow the signal from the sensors 103, 104 to be amplified prior to conveying the signal to the main board 124 with the result than any noise or other RF frequency added to the signal is relatively much smaller than the amplified signal leaving from "B" of FIG. 1 with the result that the signal is relatively clean and may be clearly determined by the missing pulses detector 122 and supervisor circuit 123 so as to determine the condition of the flame in the burner 100 without fear of common mode RF radiation that might otherwise be gathered by the cables 125, 126, 127 creating an erroneous signal to the missing pulses detector 124 and sensor supervisor 123.

If the burner 100 terminates operation, it may be desirable to determine the reason for such shutdown. There are several problems that may cause such shutdown as described hereinafter.

First and most likely, the burner 100 becomes starved for fuel because of fuel exhaustion. In this event, the flame out condition will initiate operation of the microcontroller 134 in an attempt to again commence operation of the burner 100. This in intended, for example, to deal with the problem of an air bubble in the fuel line to the burner 100. If, following three (3) attempts to commence operation of the burner 100, the burner 100 fails in continued operation, the burner 100 will remain in its shutdown condition and operator intervention will be required.

Second, it may be that the positive wires 125 (FIG. 2B) become disconnected between the amplifier 111 and the microcontroller 134 of the main board 124. In this event, the burner 100 will be in the shutdown condition and the operator will initiate power flow to the burner 100. The LED 120 will not flash since the circuit between the amplifier 111 and the main board 124 is not complete. The operator will then know that either the positive or ground wires 125, 126 are defective.

If LED 120 flashes when power flow commences, the positive and ground wires 125, 126 are not the reason for the shutdown and the burner 100 will commence operation. If the LED 120 is not flashing when the flame is again present, the sensor 103 itself is at fault. If the LED 120 is flashing and the sensor 103 is functioning, it indicates that the signal wire 127 between the amplifier 111 and the main board is defective.

The time of burner shutdown and the number of attempted restarts of the burner may, of course, be clearly changed by appropriate programming of the microcontroller 134. The sensor 103 can operate into a range of 8-40 VDC supply voltage. The signal and the output will be in the range of 0-8 VDC if the output signal stays at high level (over 3.5 VDC) for a period of time which exceeds the present time in the sensor supervisory circuit and an alarm signal will be generated by the sensor supervisory circuit to the microcontroller 134 to shut down the burner.

While a photodiode and a photoresistor have been illustrated and described, various other sensors could likewise be used including a phototransistor and a photocell.

Figure 8:
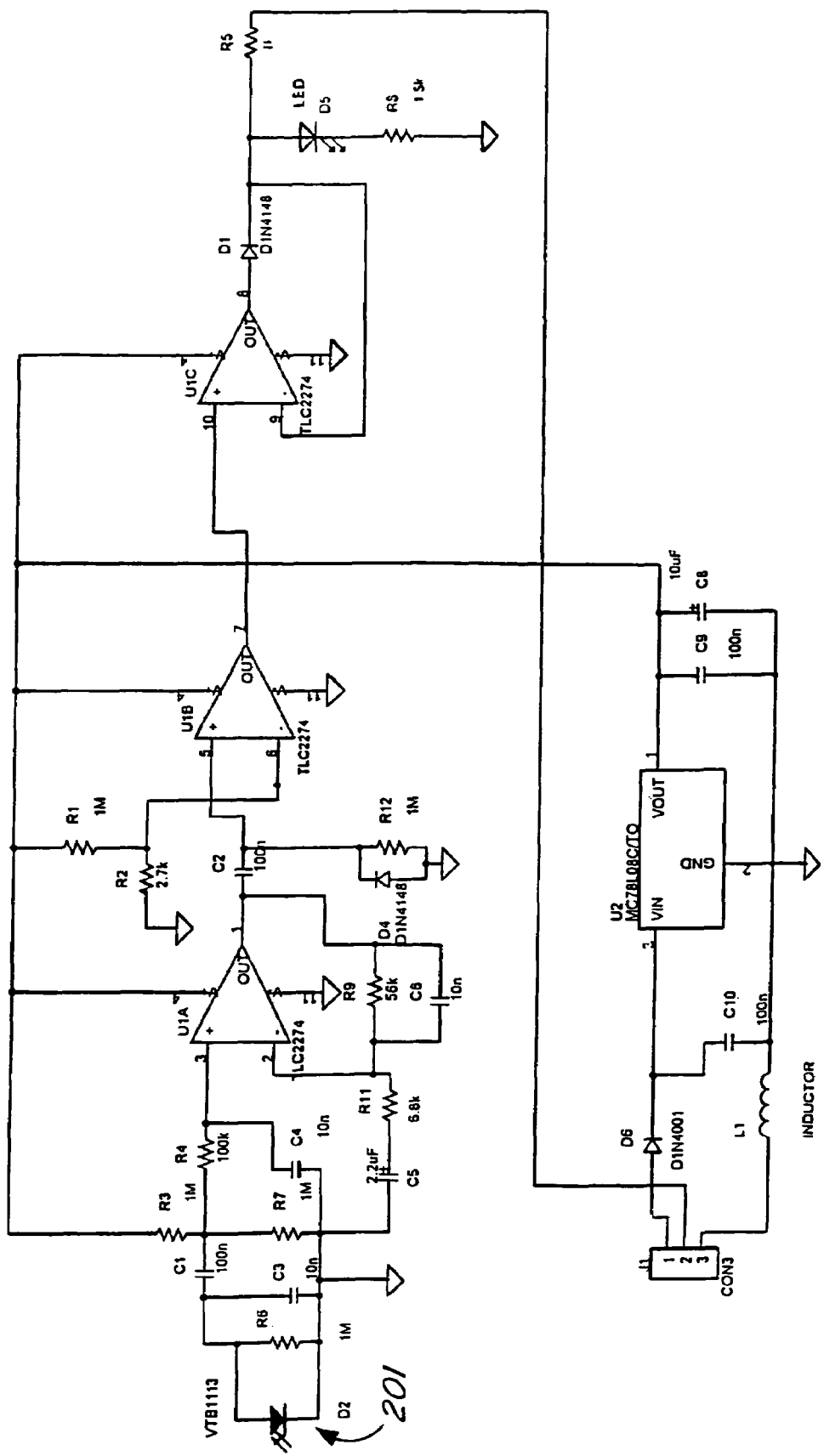
FIG. 8 is a diagrammatic schematic illustrating a modified circuit for the flame sensor.

In a further embodiment of the invention, reference is now made to FIG. 8 wherein a modified circuit for the flame sensor is generally illustrated at 200. In this circuit, the photodiode being the flame sensor 201 generates a voltage corresponding to the brightness of the flame, mainly in the red and near infrared regions. Its response extends into the blue but the output is much lower. However, the photodiode 201 is a very high speed device and its output had a high flicker content, in step with the flicker of the flame. The photodiode 201 is a photovoltaic device thereby generating electricity as a result of the light it receives from the flame.

The signal from the photodiode 201 is passed through C1 which blocks the actual brightness component of the flame and leaves only the "flicker" signal. This makes the circuit 200 insensitive to ambient light which does not flicker. The circuit 200 thereby allows for the use of different fuels which burn at different brightnesses.

The flicker signal is amplified by amplifier U1A and passes through C2 where the signal is moved from a biased reference to a ground reference by R12 and D4. This flicker signal is further amplified by amplifier U1B and detected by U1C, a generally lossless rectifier circuit.

It will be particularly noted that the feedback loop between the output of U1B and the inverting input of U1B has been eliminated with the result that there is no noise added to the inverting input of U1B. This allows increased amplification of the signal leaving U1B which results in the full amplification of every pulse signal generated by the photodiode 201 from the flicker of the flame thereby allowing greater reading sensitivity of the pulsed signal generated by the photodiode 201.

Figure 9:
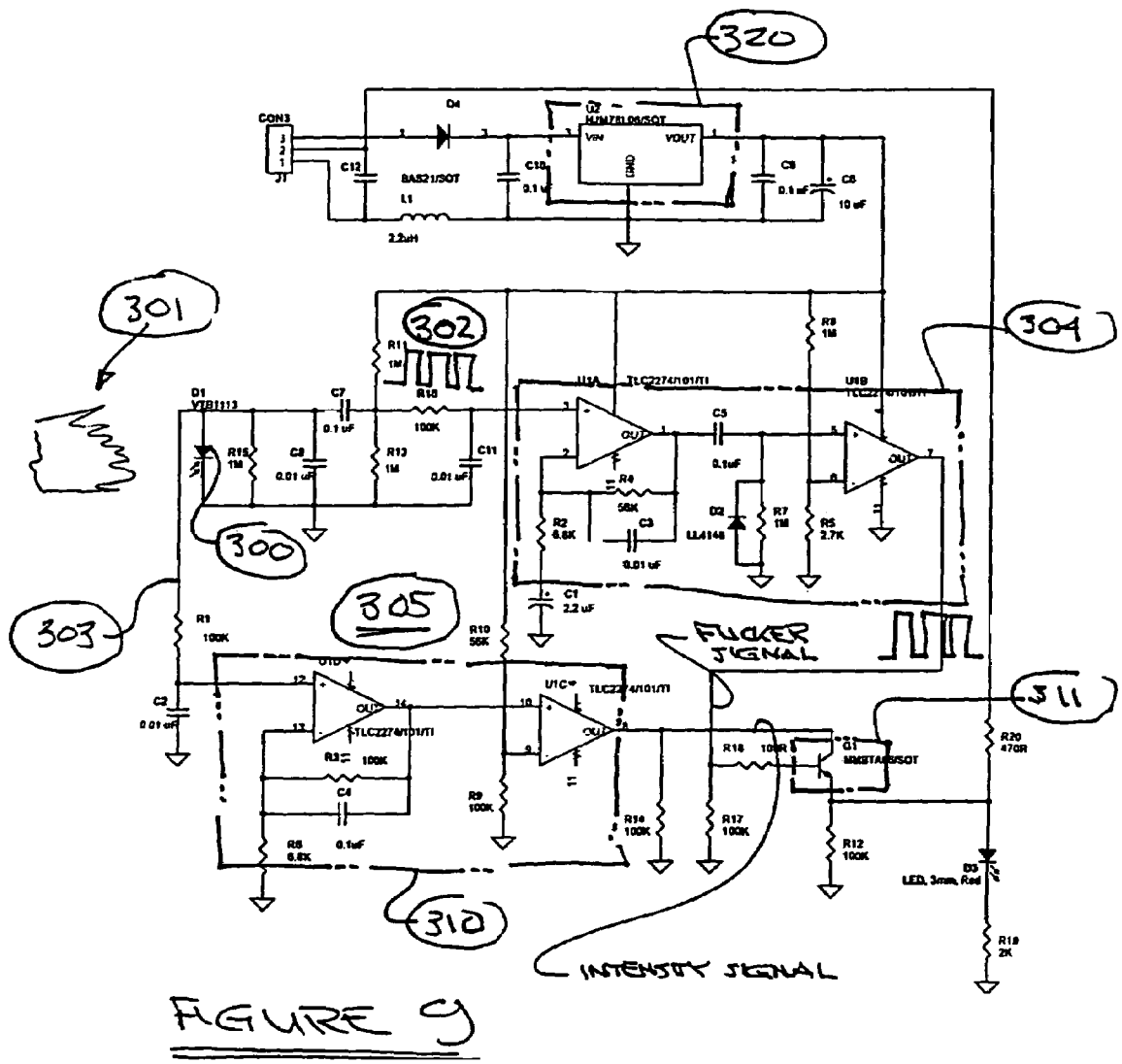
FIG. 9 is a diagrammatic schematic illustrating a flame sensor circuit according to a further aspect of the invention.

Yet a further embodiment of the invention is illustrated in FIG. 9 which is a schematic of a further circuit used to sense the presence of flame in a burner according to a further aspect of the invention.

A first sensor, conveniently a photo diode 300 is used to sense the presence or absence of a flame generally illustrated at 301 which flame 301 is present in a burner generally illustrated at 305 under normal operation. When a flame 301 is present, the photo diode 300 produces a first signal 302 due to the flicker of the flame 301 and a second intensity signal 303 due to the light intensity of the flame 301. The first signal 302 is amplified by amplifier 304 and then passes to the base of a transistor 311. The second signal 303 is amplified by amplifier 310 and passes to the collector of transistor 311.

When both the first amplified flicker signal 302 and the second amplified intensity signal 303 are sensed by transistor 311, the emitter of transistor 311 produces an output signal which indicates the presence of a flame 301 within the burner. If however, either the first amplified flicker signal 302 or the second amplified intensity signal 303 is not present at the transistor 311, the emitter will not produce an output signal which indicates the absence of a flame 301 within the burner. For example, although a first flicker signal 302 may be wrongfully present such as may be the case when noise contaminates the amplifier 304, even though a flame 301 may not be present, the second intensity signal 303 will not be present in such a case which will, therefore, result in no signal being generated by transistor 311. Thus, the control unit of the burner 305 will conclude no flame is present and the burner 305 will terminate operation as a safety precaution.

A voltage regulator 320 is provided to power the circuit of the flame sensor. This voltage regulator 320 will allow external noise generated by the various heater components to pass into the flame sensor circuit 305 if the level of such noise pulls the input voltage to the regulator 320 below the minimum required voltage. For example, an eight (8) volt regulator is required t have a minimum of 9.5 volts at the input. If the input is 10 volts and 2 volts (peak to peak) of noise is present, then the input voltage will go between 9 volts and 11 volts. When it drops below 9 volts, the regulator will no longer filter the noise. By utilising a 6 volt regulator in accordance with present invention, the minimum required voltage is 7.5 volts. So for an input voltage of 10 volts, there will need to be 5 volts (peak to peak) of noise to cause the voltage regulator to pass the noise.

Many modifications will readily occur to those skilled in the art to which the invention relates. For example, although a photo diode 300 and a transistor 311 are useful in the flame sensor circuit according to the invention, it seems clear they could be replaced by other suitable components which could sense both flame flicker and flame intensity. And although transistor 311 works appropriately and is conveniently used, it is apparent that other components might well be used to generate appropriate signals when flame flicker and flame intensity signals are present at the circuit component.

Many further modifications will readily occur to those skilled in the art to which the invention relates and the particular embodiments herein described should be taken as illustrative of the invention only and not as limiting its scope as defined in accordance with the accompanying claims.

I claim:

1. A method of sensing the presence of a flame in a burner comprising the steps of generating a first signal from a sensor which first signal is an intensity signal which is proportional to the light intensity of said flame in said burner, generating a second signal by detecting the change of voltage in said sensor which change of voltage is caused by the flicker of said flame in said burner, detecting whether said first and second signals are present at a signal circuit component and producing an output signal from said signal circuit component if said first and second signals are both detected at said signal circuit component.

2. Method of sensing a flame as in claim 1 wherein said sensor is a photo diode and wherein said signal circuit component is a transistor which produces said output signal.

3. Method as in claim 2 wherein said intensity signal is amplified prior to said signal being present at said transistor.

4. Method as in claim 3 wherein said intensity signal is applied to said transistor at the collector of said transistor, said output signal being generated at the emitter of said transistor.

5. Method as in claim 4 wherein said second signal is applied to the base of said transistor.

6. Method as in claim 5 where said output signal is a flicker signal when said first and second signals are present at said transistor.

7. A circuit for a flame sensor used for sensing the presence of a flame in a burner, said circuit comprising a sensor for sensing said flame, said sensor producing a first intensity signal which is a voltage proportional to the light intensity of said flame in said burner, said sensor producing a second flickering signal sensing the flicker of said flame in said burner, and a second output signal circuit component for producing an output signal when said first intensity signal and said second flickering signal are present at said second output signal circuit component.

8. Circuit as in claim 7 wherein said sensor is a photo diode and said second output signal circuit component is a transistor.

9. Circuit as in claim 8 and further comprising a first amplifier for amplifying said first intensity signal prior to said signal being received by said transistor.

10. Circuit as in claim 9 wherein said second flickering signal is produced by voltage changes in said photo diode caused by said flicker of said flame.

11. Circuit as in claim 10 wherein said second flickering signal is amplified by a second amplifier prior to said second signal being received by said transistor.

12. A method of sensing the presence of a flame in a burner comprising the steps of generating a first signal from a photo diode which first signal is an intensity signal proportional to the light intensity of said flame in said burner, generating a second signal by detecting the change of voltage in said sensor which change of voltage is caused by the flicker of said flame in said burner, said second signal being a flicker signal, amplifying said intensity signal, passing said intensity signal and said flicker signal to the collector and base of a transistor, detecting whether said intensity and flicker signals are present at said base and collector of said transistor and emitting an output signal from said transistor if said intensity and flicker signals are present at said base and collector of said transistor.

* * * * *